(12) United States Patent
Rohr

(10) Patent No.: US 8,907,780 B2
(45) Date of Patent: Dec. 9, 2014

(54) VEHICLE BRAKE LIGHT SYSTEM AND METHOD OF ALERTING A FOLLOWING VEHICLE OF AN UNSAFE FOLLOWING DISTANCE

(75) Inventor: Andrew P. Rohr, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 13/547,683

(22) Filed: Jul. 12, 2012

(65) Prior Publication Data

US 2014/0015666 A1    Jan. 16, 2014

(51) Int. Cl.
*B60Q 1/44*    (2006.01)
*B60Q 1/52*    (2006.01)
*G01S 13/93*    (2006.01)

(52) U.S. Cl.
CPC ............. *G01S 13/931* (2013.01); *B60Q 1/525* (2013.01)
USPC .......................................... 340/479; 340/903

(58) Field of Classification Search
CPC ...... G01S 13/931; B60Q 1/525; B60Q 9/008; B60Q 1/46; B60Q 1/444
USPC ................... 340/479, 435, 468, 903; 180/169
See application file for complete search history.

(56) References Cited

U.S. PATENT DOCUMENTS

| 5,508,706 | A  | * | 4/1996  | Tsou et al.      | 342/192 |
| 6,225,918 | B1 | * | 5/2001  | Kam              | 340/903 |
| 6,850,156 | B2 | * | 2/2005  | Bloomfield et al.| 340/467 |
| 7,123,168 | B2 | * | 10/2006 | Schofield        | 340/435 |
| 2003/0151502 | A1 | * | 8/2003 | Kam              | 340/435 |
| 2009/0256698 | A1 | * | 10/2009 | Bonilla          | 340/479 |

* cited by examiner

*Primary Examiner* — John A Tweel, Jr.
(74) *Attorney, Agent, or Firm* — Cantor Colburn LLP

(57) ABSTRACT

A vehicle brake light system includes a proximity sensing device disposed proximate a rearward region of a vehicle for determining whether an object is located within a predetermined distance of the rearward region of the vehicle. Also included is at least one brake light disposed proximate the rearward region of the vehicle, wherein the at least one brake light is configured to be in an illuminated state or a non-illuminated state. Further included is a controller in operable communication with the proximity sensing device, wherein the controller is configured to receive a proximity sensing device signal when the object is within the predetermined distance and configured to send an alert signal to the at least one brake light to enact the illuminated state upon receiving the proximity sensing device signal from the proximity sensing device.

15 Claims, 3 Drawing Sheets

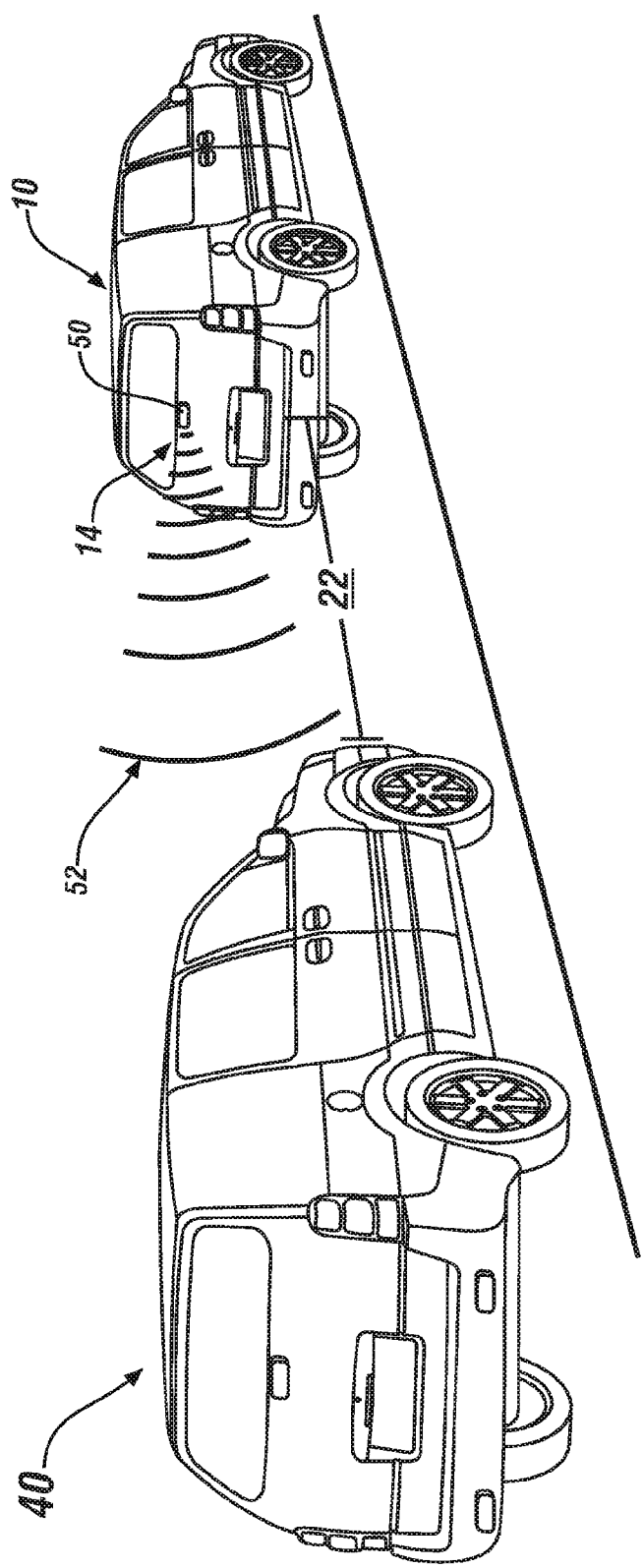
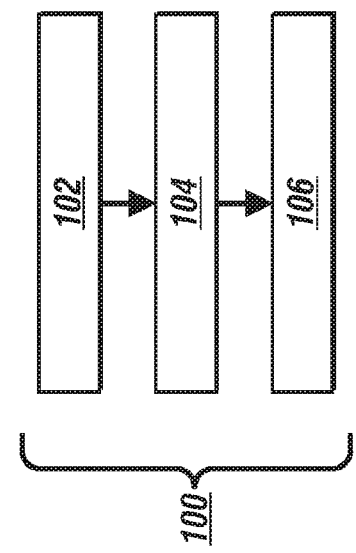

VEHICLE BRAKE LIGHT SYSTEM AND METHOD OF ALERTING A FOLLOWING VEHICLE OF AN UNSAFE FOLLOWING DISTANCE

FIELD OF THE INVENTION

The subject invention relates to vehicles, and more particularly to vehicle brake light systems, as well as a method of alerting a following vehicle of an unsafe following distance of a user vehicle with such a brake light system.

BACKGROUND

Typically, a vehicle brake light system includes one or more brake lights that are illuminated only upon the manual command of a driver in the form of physical depression of a brake pedal. Travelling in vehicles with such brake light systems involves a myriad of dangers, including unsafe driving by other drivers on the road. One such hazard includes the following of one vehicle of another vehicle at too close of a distance. This may include inadvertent following at a close distance or rapid closing of a distance by an inattentive or distracted driver. Unfortunately, such unsafe driving may also be intentional and is commonly referred to as "tailgating." In either event, driving too closely often results in a rear-end collision that poses safety risks to passengers of both vehicles, as well as causing damage to both vehicles, thereby leading to costly repairs that could otherwise be avoided if a safe following distance was maintained by the following vehicle.

Illuminating or intermittently flashing one or more brake lights is a common tactic to obtain a driver's attention, in the case of inadvertent close following, or communicate frustration, in the case of intentional tailgating. One drawback associated with such a tactic is the above-noted requirement to actually manually depress the brake pedal, thereby requiring effort and attention of the followed driver, as well as potential for physical braking of the vehicle. Such requirements distract the driver and necessitate additional usage of the braking system.

SUMMARY OF THE INVENTION

In one exemplary embodiment of the invention, a vehicle brake light system includes a proximity sensing device disposed proximate a rearward region of a vehicle for determining whether an object is located within a predetermined distance of the rearward region of the vehicle. Also included is at least one brake light disposed proximate the rearward region of the vehicle, wherein the at least one brake light is configured to be in an illuminated state or a non-illuminated state. Further included is a controller in operable communication with the proximity sensing device, wherein the controller is configured to receive a proximity sensing device signal when the object is within the predetermined distance and configured to send an alert signal to the at least one brake light to enact the illuminated state upon receiving the proximity sensing device signal from the proximity sensing device.

In another exemplary embodiment of the invention, a method of alerting a following vehicle of an unsafe following distance of a user vehicle with a vehicle brake light system is provided. The method includes determining whether the following vehicle is within a predetermined distance of a rearward region of the user vehicle with a proximity sensing device disposed proximate the rearward region of the user vehicle. Also included is communicating a proximity sensing device signal from the proximity sensing device to a controller disposed on the user vehicle if the following vehicle is within the predetermined distance. Further included is communicating an alert signal from the controller to at least one brake light of the user vehicle to enable an illuminated state of the at least one brake light.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 5 is a perspective view of the vehicle being followed by the following vehicle according to the second embodiment of FIG. 4; and FIG. 6 is a flow diagram illustrating a method of alerting a following vehicle of an unsafe following distance.

DESCRIPTION OF THE EMBODIMENTS

Figure 1:
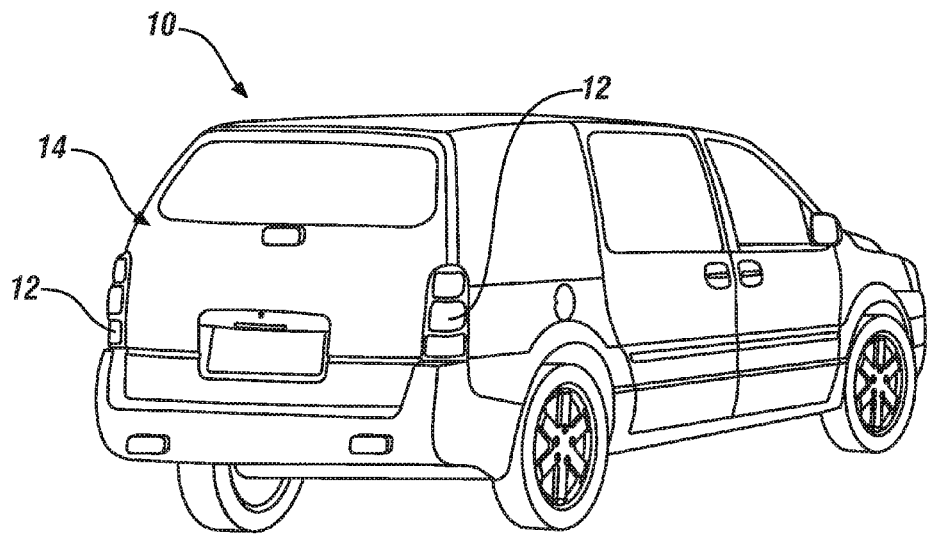
FIG. 1 is a perspective view of a vehicle having a brake light system.

The following description is merely exemplary in nature and is not intended to limit the present disclosure, its application or uses. It should be understood that throughout the drawings, corresponding reference numerals indicate like or corresponding parts and features.

Referring to FIG. 1, in accordance with an exemplary embodiment of the invention, a vehicle is shown in the form of an automobile and is generally referred to with numeral 10. Although the vehicle 10 is illustrated as an automobile, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. The preceding list is merely illustrative and is not intended to be limiting of the numerous automobile types that may benefit from the embodiments of the invention.

The vehicle 10 includes at least one brake light 12, but typically a plurality of brake lights will be employed. The at least one brake light 12 is disposed proximate a rearward region 14 of the vehicle 10 and may be located at various heights along the rearward region 14. The at least one brake light 12 is configured to switch between an illuminated state and a non-illuminated state. The illuminated state of the at least one brake light 12 is achieved by routing of electricity to the at least one brake light 12, which may comprise a light bulb and/or a light emitting diode (LED). In the illuminated state, the at least one brake light 12 may be displayed as various colors, however, a relatively red or amber color, or the like, is typically displayed to alert drivers of surrounding vehicles in close proximity to the vehicle 10, particularly a driver of a following vehicle 40, shown in FIGS. 3 and 5, travelling directly behind the vehicle 10, that braking of the vehicle 10 is occurring. Such an alert prompts the following vehicle to take appropriate measures, such as slowing down to accommodate for the braking of the vehicle 10.

Figure 2:
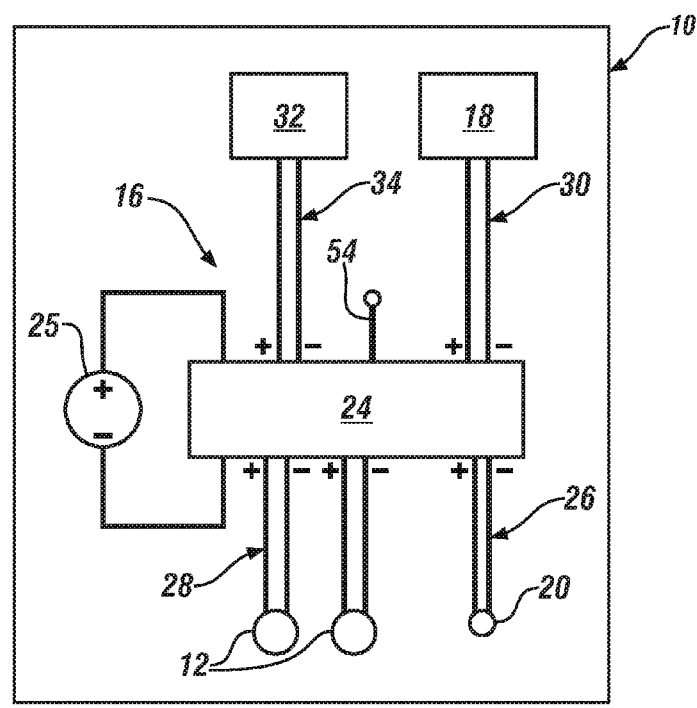
FIG. 2 is a schematic illustration of the brake light system according to a first embodiment.
Figure 3:
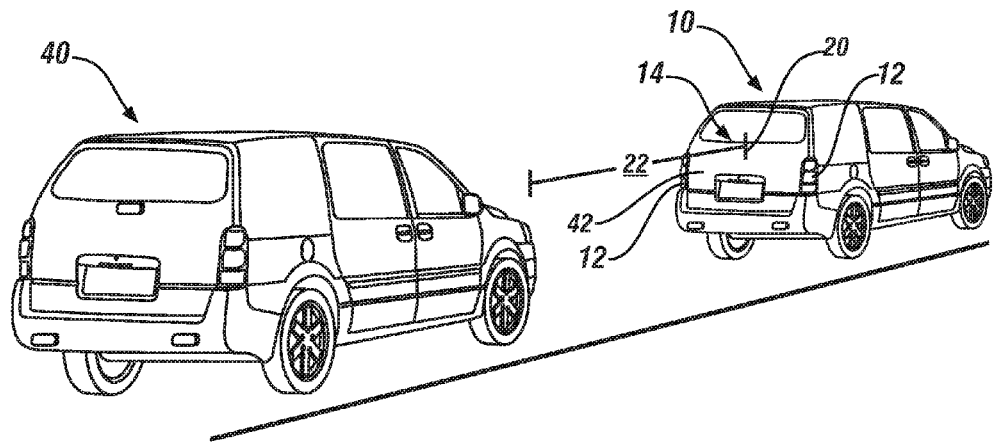
FIG. 3 is a perspective view of the vehicle being followed by a following vehicle according to the first embodiment of FIG. 2.

Referring now to FIGS. 2 and 3, a brake light system 16 according to a first exemplary embodiment is illustrated. The brake light system 16 may be disposed at various locations within the vehicle 10 and includes the previously described at least one brake light 12. The brake light system 16 generally functions to alert the driver of the following vehicle 40 of an unsafe following distance, with respect to the rearward region 14 of the vehicle 10. The brake light system 16 provides such an alert without requiring actual braking of the vehicle 10, thereby alleviating the need for a user of the vehicle 10 to physically depress a brake pedal 18 that is disposed proximate the user's foot at an interior region of the vehicle 10.

The brake light system 16 includes a proximity sensor 20 that is disposed proximate the rearward region 14 of the vehicle 10. The proximity sensor 20 may be located along an exterior surface 42 of the rearward region 14 of the vehicle 10, or in a recess therein. As is the case with the at least one brake light 12, the proximity sensor 20 may be located at various heights along the rearward region 14. The proximity sensor 20 may be in the form of numerous types of sensors, with one embodiment being an ultrasonic sensor, for example. Irrespective of the precise type of sensor employed, the proximity sensor 20 is configured to sense objects within a predetermined distance 22. Specifically, the proximity sensor 20 is configured to determine whether the following vehicle 40 is located within the predetermined distance 22.

The proximity sensor 20 is in operable communication with a controller 24, such as an electronic control unit (ECU), which is configured for receiving a variety of information and is configured to perform numerous functions associated with operation of various electrical systems and/or subsystems in the vehicle 10. The controller 24 is provided power by a power source 25, such as a battery, which may be in the form of a 12V direct current (DC) battery. The operable communication between the proximity sensor 20 and the controller 24 facilitates relaying of a proximity sensing device signal 26 from the proximity sensor 20 to the controller 24 in the event an object, such as the following vehicle 40, is located within the predetermined distance 22. Upon receipt of the proximity sensing device signal 26, the controller 24 provides an alert signal 28 to the at least one brake light 12, which is also in operable communication with the controller 24. The alert signal 28 initiates the illuminated state of the at least one brake light 12 until the following vehicle 40 is no longer located within the predetermined distance 22. It is further contemplated that the alert signal 28 initiates a flashing state of the at least one brake light 12 until the following vehicle 40 is no longer located within the predetermined distance 22. The flashing state includes an intermittent switching of the at least one brake light 12 between the illuminated state and the non-illuminated state.

The brake pedal 18 is also in operable communication with the controller 24 and in combination with applying the brakes of the vehicle 10 to slow down the vehicle 10, depression of the brake pedal 18 additionally sends an override signal 30 to the controller 24 that overrides the ability of the controller 24 to send the alert signal 28 to the at least one brake light 12. The override signal 30 ensures that a steady illumination of the at least one brake light 12 is provided during actual braking of the vehicle 10. The brake light system 16 may be completely overridden and disabled by the user of the vehicle 10 by manually switching a toggle switch 32 to an "off" position. Conversely, to enable the brake light system 16, the toggle switch 32 may be manually adjusted to an "on" position. The toggle switch 32 is in operable communication with the controller 24, with the operable communication facilitating the provision of an enable/disable signal 34 to the controller 24.

The predetermined distance 22 described above may comprise various distances. For example, the predetermined distance 22 may be a factory default fixed distance, a user programmable fixed distance, or a variable distance that is a function of speed of the vehicle 10. In the case of a variable distance that is a function of speed of the vehicle 10, a vehicle speed signal 54 may be in communication with the controller 24, and thereby the proximity sensor 20, to constantly adjust the predetermined distance 22 based on the instantaneous speed of the vehicle 10. Other contemplated factors that may adjust the predetermined distance 22 are surface terrain and road conditions, for example.

Figure 4:
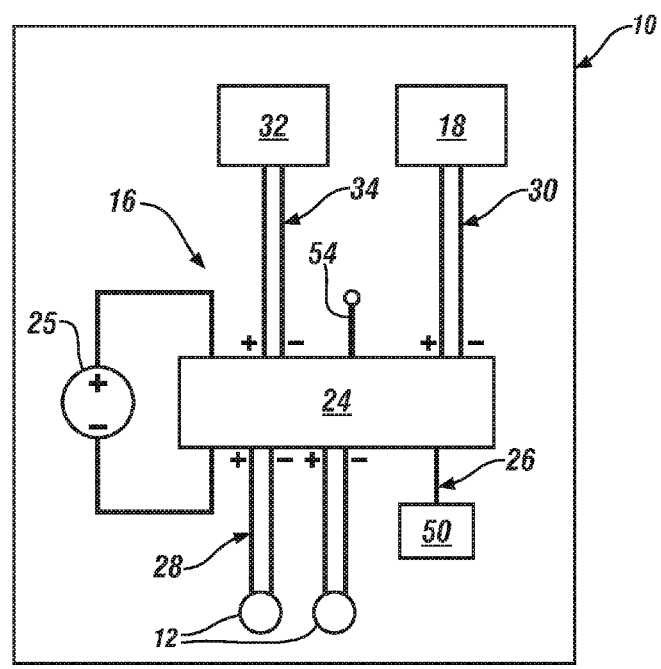
FIG. 4 is a schematic illustration of the brake light system according to a second embodiment.

Referring now to FIGS. 4 and 5, the brake light system 16 according to a second exemplary embodiment is illustrated. The brake light system 16 of the second embodiment is similar in many respects to that of the first embodiment, however, in contrast to the proximity sensor 20 of the first embodiment, a radar unit 50 is employed to determine whether the following vehicle 40 is within the predetermined distance 22 of the rearward region 14 of the vehicle 10.

The radar unit 50 comprises various components, such as a transmitter, a duplexer, a receiver and an antenna, for example. It is to be appreciated that additional or alternative components may be employed, but irrespective of the precise configuration of the radar unit 50, radio waves 52 are employed to determine the range and/or speed of the following vehicle 40. Similar to the first embodiment, detection of an object, namely the following vehicle 40, within the predetermined distance 22 results in the measures described in detail above. To reiterate, the measures include provision of the proximity sensing device signal 26 to the controller 24, followed by sending of the alert signal 28 to the at least one brake light 12, which initiates the illuminated state or the flashing state. Override functions are also available, as is the case with the first embodiment.

It is also contemplated that the brake light system 16 of the second embodiment is configured to work in conjunction with other vehicles equipped with similar radar units, such that vehicle-to-vehicle communication is achieved, with respect to detection of position and distance between each other. Such a feature allows all vehicles equipped with the radar unit 50 to detect the position and distance between one another. In this embodiment, the radar unit 50 may be disposed at various locations of the vehicle 10.

A method of alerting a following vehicle of an unsafe following distance of a user vehicle with a brake light system 100 is also provided as illustrated in FIG. 6 and with reference to FIGS. 1-5. The vehicle 10, and more specifically the brake light system 16 have been previously described and specific structural components need not be described in further detail.

The method of alerting a following vehicle of an unsafe following distance of a user vehicle with a brake light system 100 includes determining whether the following vehicle is within a predetermined distance 102. Specifically, and as described above, a determination is made whether the following vehicle is located at or within the predetermined distance 22, which is defined between the rearward region 14 of the vehicle 10 and the following vehicle 40. Upon determining an object within the predetermined distance 22, a proximity sensing device signal is communicated to a controller 104. The controller then communicates an alert signal to at least one brake light 106 to enable an illuminated state of the at least one brake light 12. Alternatively, as described above, a flashing state of the at least one brake light 12 may be initiated upon communication of the alert signal 28.

Advantageously, the user of the vehicle 10 is not required to direct effort and attention toward physically depressing the brake pedal 18 to alert the driver of the following vehicle 40 that an unsafe following distance is occurring. Additionally, the brake light system 16 alleviates the requirement that the vehicle 10 actually brakes to provide such an alert. As a result, the brakes light system 16 reduces collisions between vehicles, and more particularly reduces rear-end collisions associated with unsafe following distances.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle brake light system comprising:
   a proximity sensing device disposed proximate a rearward region of a vehicle for determining whether an object is located within a predetermined distance of the rearward region of the vehicle;
   at least one brake light disposed proximate the rearward region of the vehicle, wherein the at least one brake light is configured to be in an illuminated state or a non-illuminated state;
   a controller in operable communication with the proximity sensing device, wherein the controller is configured to receive a proximity sensing device signal when the object is within the predetermined distance and configured to send an alert signal to the at least one brake light to enact the illuminated state upon receiving the proximity sensing device signal from the proximity sensing device; and
   a vehicle speed signal configured to constantly communicate an instantaneous speed of the vehicle to the controller to constantly adjust the predetermined distance based on an increase or a decrease of the instantaneous speed of the vehicle.

2. The vehicle brake light system of claim 1, wherein the proximity sensing device comprises a proximity sensor.

3. The vehicle brake light system of claim 2, wherein the proximity sensor comprises an ultrasonic sensor.

4. The vehicle brake light system of claim 1, wherein the proximity sensing device comprises a radar unit.

5. The vehicle brake light system of claim 4, wherein the radar unit comprises a transmitter, a duplexer, a receiver and an antenna.

6. The vehicle brake light system of claim 1, further comprising a toggle switch located within an interior portion of the vehicle and configured to allow the user to enable or disable the vehicle brake light system.

7. The vehicle brake light system of claim 1, wherein the controller is provided power by a battery.

8. The vehicle brake light system of claim 1, wherein the alert signal enacts a flashing state of the at least one brake light, wherein the flashing state comprises intermittent switching between the illuminated state and the non-illuminated state.

9. The vehicle brake light system of claim 1, further comprising a brake pedal in operable communication with the controller, wherein depression of the brake pedal by the user overrides the ability of the controller to send the alert signal to the at least one brake light.

10. A method of alerting a following vehicle of an unsafe following distance of a user vehicle with a vehicle brake light system comprising:
    determining whether the following vehicle is within a predetermined distance of a rearward region of the user vehicle with a proximity sensing device disposed proximate the rearward region of the user vehicle, wherein the predetermined distance is constantly adjusted based on an increase or decrease of an instantaneous speed of the vehicle that is constantly communicated by a vehicle speed signal to a controller;
    communicating a proximity sensing device signal from the proximity sensing device to the controller disposed on the user vehicle if the following vehicle is within the predetermined distance; and
    communicating an alert signal from the controller to at least one brake light of the user vehicle to enable an illuminated state of the at least one brake light.

11. The method of claim 10, wherein the illuminated state of the at least one brake light comprises an intermittent flashing of the at least one brake light.

12. The method of claim 10, wherein the proximity sensing device comprises a proximity sensor.

13. The method of claim 10, wherein the proximity sensing device comprises a radar unit.

14. The method of claim 10, further comprising enable or disabling the vehicle brake light system with a toggle switch disposed within an interior portion of the user vehicle.

15. The method of claim 10, further comprising depressing a brake pedal in operable communication with the controller to override the ability of the controller to send the alert signal to the at least one brake light.

* * * * *